(12) United States Patent
Lin

(10) Patent No.: US 8,807,311 B2
(45) Date of Patent: Aug. 19, 2014

(54) WINCH BRAKE

(71) Applicant: Life Style Metal Co., Ltd, Changhua (TW)

(72) Inventor: Ta-Yu Lin, Changhua (TW)

(73) Assignee: Life Style Metal Co., Ltd, Changhua (TW)

( * ) Notice: Subject to any disclaimer, the term of this patent is extended or adjusted under 35 U.S.C. 154(b) by 31 days.

(21) Appl. No.: 13/742,929

(22) Filed: Jan. 16, 2013

(65) Prior Publication Data

US 2014/0027232 A1 Jan. 30, 2014

(30) Foreign Application Priority Data

Jul. 26, 2012 (CN) ...................... 2012 2 0364571 U

(51) Int. Cl.
*F16D 67/02* (2006.01)
*B66D 5/10* (2006.01)
*B66D 1/22* (2006.01)

(52) U.S. Cl.
USPC .... 192/16; 192/17 D; 192/12 BA; 188/77 W; 254/300; 254/356; 254/378

(58) Field of Classification Search
CPC ......................................... B66D 5/10
USPC .................. 192/45.018, 15, 17 D, 16, 223.4; 254/300, 316, 347, 356, 378; 188/30, 188/77 W See application file for complete search history.

(56) References Cited

U.S. PATENT DOCUMENTS

| 1,833,615 | A | * | 11/1931 | Myers | ........................ | 192/223.4 |
| 4,651,854 | A | * | 3/1987 | Harada | ...................... | 192/223.4 |
| 5,398,923 | A | * | 3/1995 | Perry et al. | ..................... | 254/375 |
| 7,614,609 | B1 | * | 11/2009 | Yang et al. | ..................... | 254/344 |
| 7,806,386 | B2 | * | 10/2010 | Yang et al. | ..................... | 254/342 |
| 2007/0227835 | A1 | * | 10/2007 | Elliott | ............................. | 188/30 |

* cited by examiner

*Primary Examiner* — Richard M. Lorence
*Assistant Examiner* — Lillian Nguyen
(74) *Attorney, Agent, or Firm* — Muncy, Geissler, Olds & Lowe, P.C.

(57) ABSTRACT

A winch clutch includes a driving block and a driven block respective connected to a motor and a transmission shaft of a deceleration clutch mechanism of a winch, the driving block and the driven block each having two spaced protruding flanges, a brake spring mounted between the driving block and the driven block and having retaining end portions disposed at two opposite ends thereof and respectively engaged into gaps between the protruding flanges of the driving block and gaps between the protruding flanges of the driven block, a brake bush accommodating the driving block, the driven block and the brake spring, and a one-way bearing fixedly mounted in the winch around the brake bush to limit rotation of the brake bush in a first direction. Thus, the winch brake has the characteristics of high reliability and high durability.

10 Claims, 7 Drawing Sheets

WINCH BRAKE

BACKGROUND OF THE INVENTION

1. Field of the Invention

The present invention relates to winch devices of international patent classification B66D and more particularly, to a winch brake for power winch, which can effectively prevent accidents and enhance operational safety.

2. Description of the Related Art

A winch is a mechanical device that is used to pull in or let out a cable, thereby lifting or lowering a load. A winch is generally equipped with a brake that is provided between the motor and the speed reducing mechanism to prevent the drum from turning when power is off, ensuring the safety of the use of the winch.

A winch brake is known comprising a driving block rotatable by a motor, a driven block connected to a transmission shaft of a deceleration clutch mechanism, a brake spring set between the driving block and the driven block for allowing contraction or expansion of the coil diameter thereof subject to rotation of the driving block, and a brake drum surrounding the brake spring. When starting the motor to pull in the cable, the brake spring is driven by the driving block to contract, forcing the driven block and the transmission shaft of the deceleration clutch mechanism to rotate, and therefore the cable is wound up to lift the load. On the contrary, if the motor is stopped from rotating the driving block after power failure or power off, the driven block will be reserved by the force from the cable to release the brake spring, enabling the brake spring to expand and to rub against the inside wall of the brake drum. Thus, a winch equipped with a winch brake of this design has an automatic braking function.

However, the automatic braking function of the aforesaid winch brake simply relies upon contact and friction between the outer perimeter of the brake spring and the inner perimeter of the brake drum. The brake force of this design of winch brake is insufficient. After a long use, the brake spring will wear, lowering the security. So, there is still room for improvement.

SUMMARY OF THE INVENTION

The present invention has been accomplished under the circumstances in view. It is the main object of the present invention to provide a winch brake, which has the characteristics of high reliability and high durability.

To achieve this and other objects of the present invention, a winch brake is installed in a winch comprising a motor, a deceleration clutch mechanism and a winch drum. The winch brake comprises a driving block having one end thereof connected to an output shaft of the motor of the winch and rotatable by the motor and an opposite end thereof provided with two spaced protruding flanges, a driven block having one end disposed remote from the driving block and connected to a transmission shaft of the deceleration clutch mechanism for synchronous rotation and an opposite end thereof provided with two spaced protruding flanges, a brake spring mounted between the driving block and the driven block and having at least one retaining end portion disposed at each of two opposite ends thereof and respectively engaged into gaps between the two protruding flanges of the driving block and gaps between the two protruding flanges of the driven block for enabling the brake spring to be driven by the driving block or the driven block to contract or to expand, a brake bush accommodating the driving block, the driven block and the brake spring and having an inner perimeter for friction contact with an outer perimeter of the brake spring when the brake spring is driven to expand, and a one-way bearing fixedly mounted in the winch around the brake bush to limit rotation of the brake bush in a first direction.

Thus, the invention simultaneously uses the brake spring and the one-way bearing to brake the winch drum when power is off, achieving real time performance and enhancing operational reliability and durability.

Further, the winch brake is matched with the deceleration clutch mechanism in the housing of the winch. The deceleration clutch mechanism comprises a transmission shaft inserted through the winch drum, a pinion mounted at the transmission shaft corresponding to the driven block, a speed reducing gear set formed of a plurality of gears and arranged in a coaxial manner relative to the transmission shaft and meshed with the pinion, a roller arranged in a coaxial relationship relative to the transmission shaft and rotatably and slidably mounted in the housing and having a plurality of axial teeth spaced around a tapered inner perimeter thereof, the roller being axially movable between an engaged position where the axial teeth are meshed with the speed reducing gear set and a disengaged position where the axial teeth are disengaged from the speed reducing gear set, and an adjustment unit for controlling sliding movement of the roller.

Thus, the deceleration clutch mechanism has the characteristic of easy to operate, facilitating user operation.

DETAILED DESCRIPTION OF THE INVENTION

Figure 1:
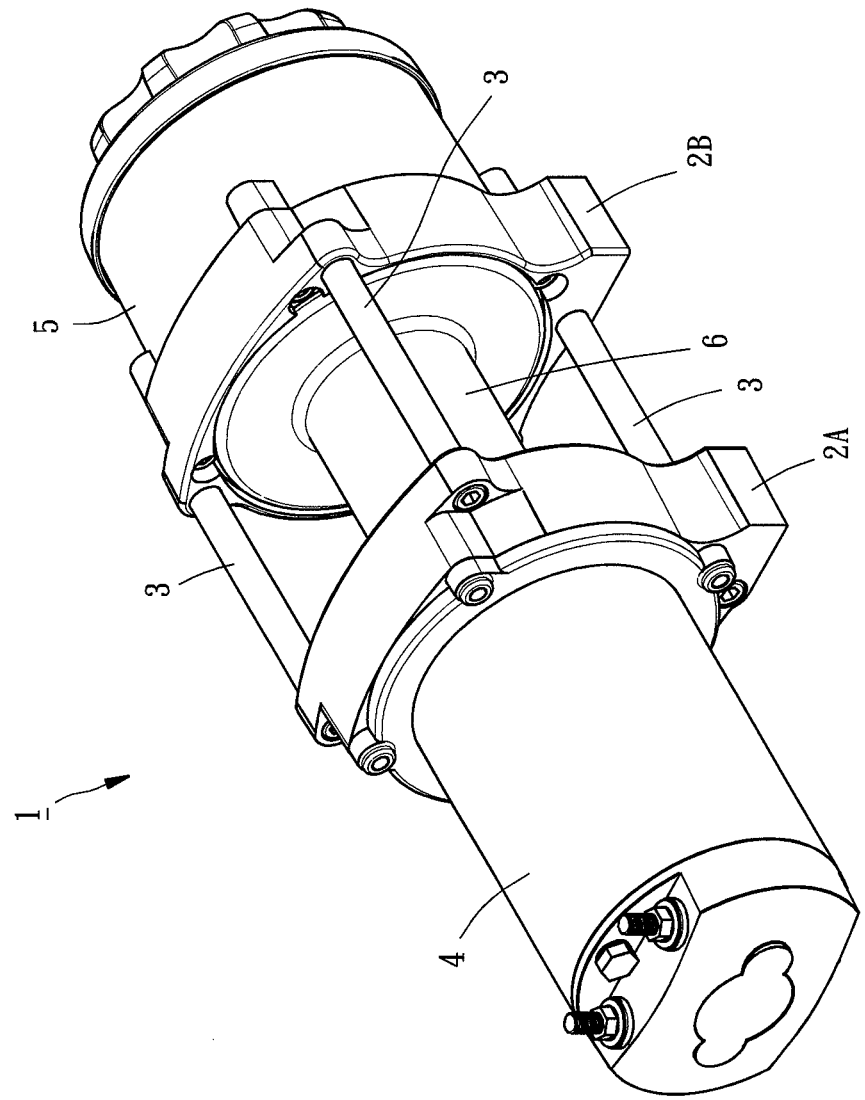
FIG. 1 is an oblique elevational view of a winch in accordance with the present invention.
Figure 2:
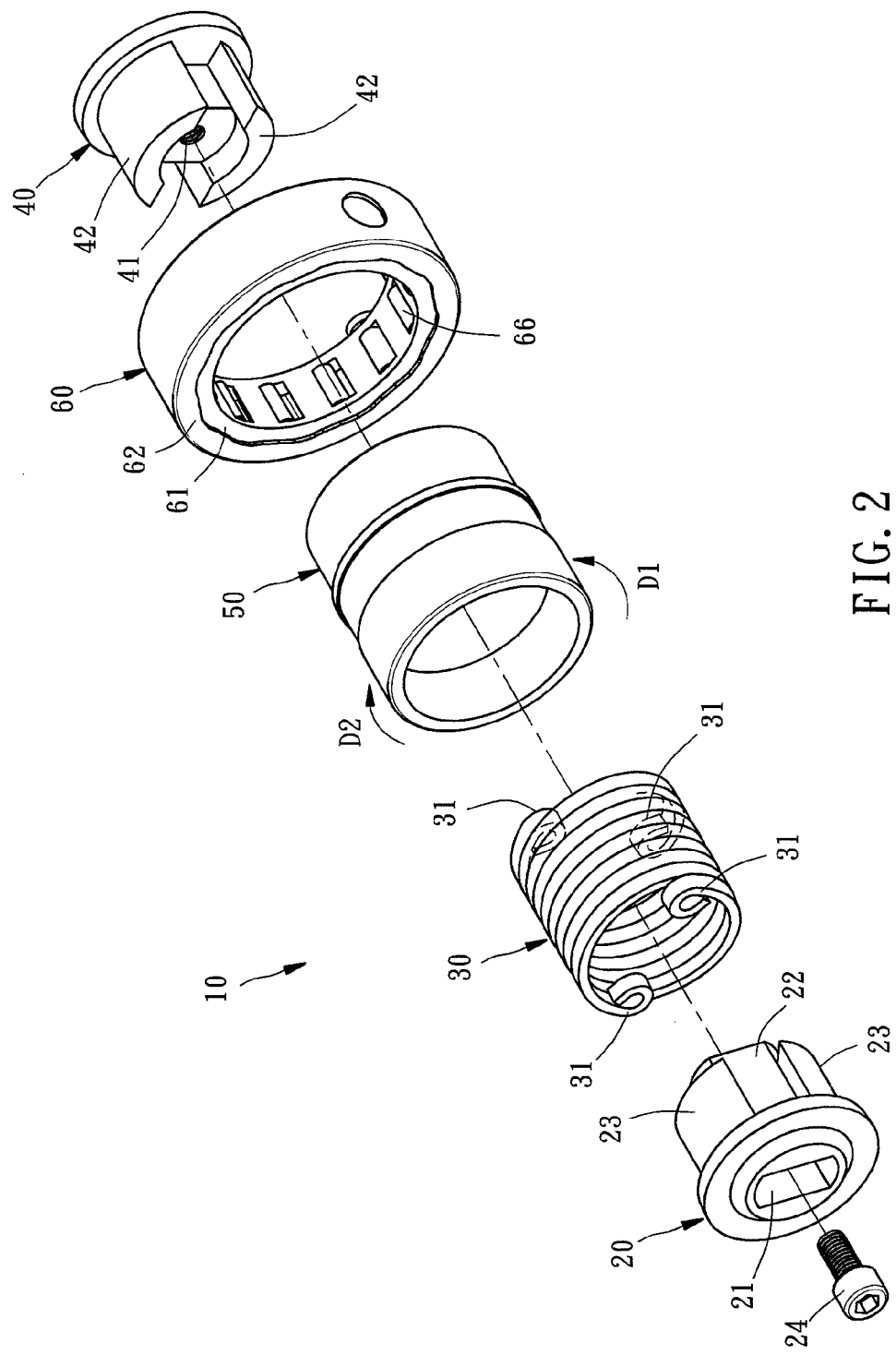
FIG. 2 is an exploded view of a winch brake in accordance with the present invention.
Figure 3:
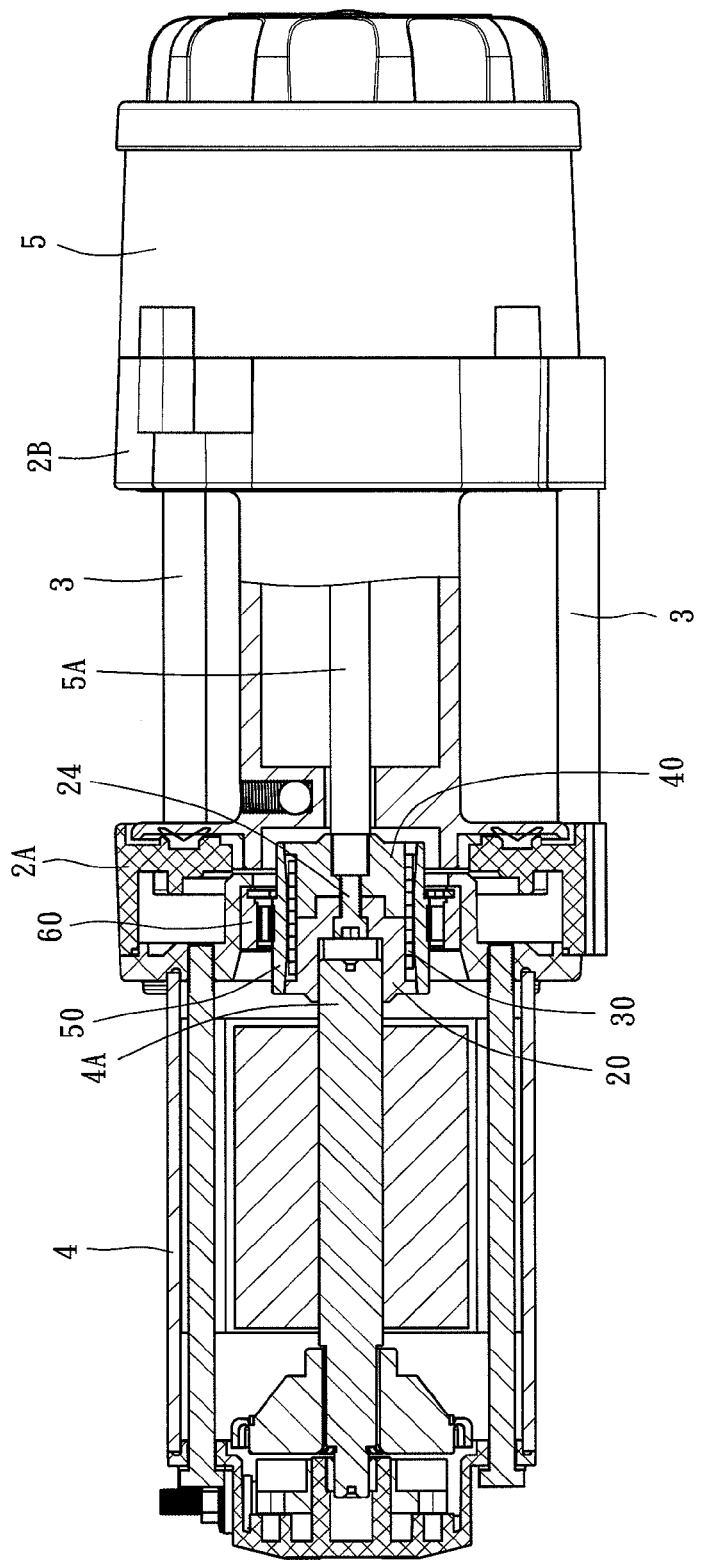
FIG. 3 is a sectional view of the present invention, illustrating the winch brake installed in the winch.
Figure 4:
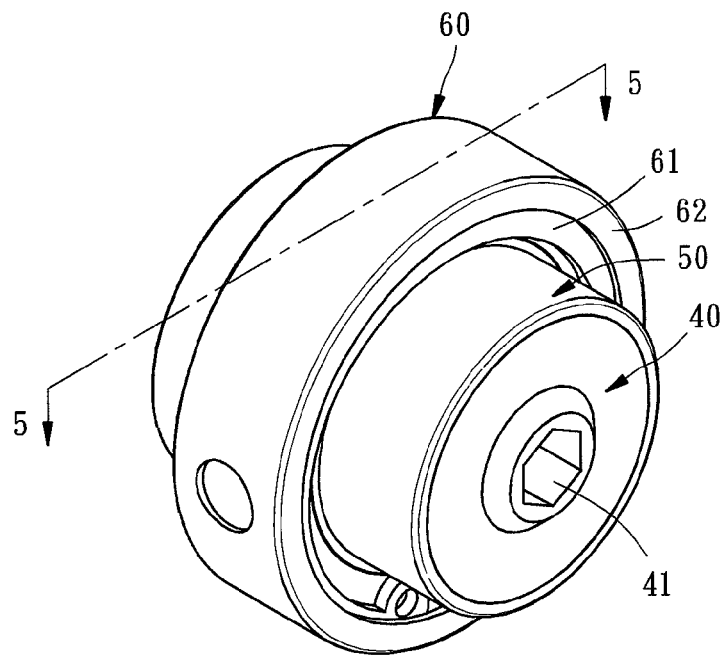
FIG. 4 is an elevational assembly view of the winch brake in accordance with the present invention.
Figure 5:
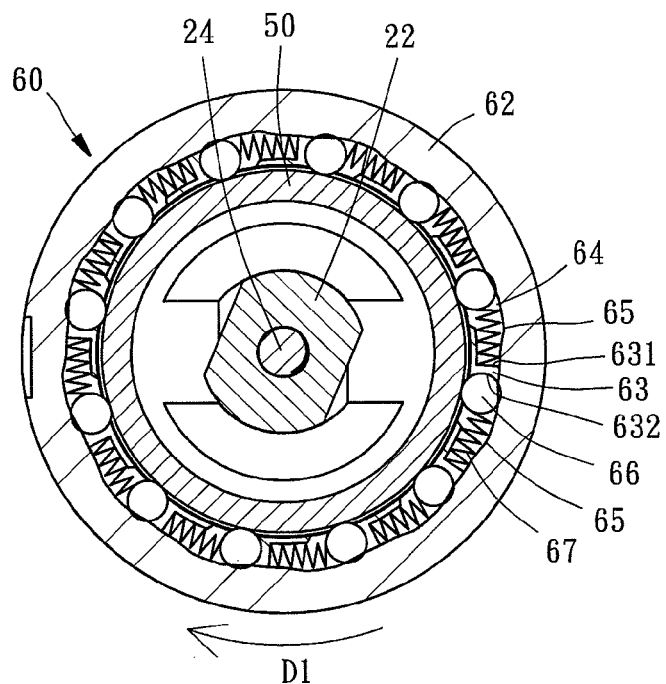
FIG. 5 is a sectional view taken along line 5-5 of FIG. 4.

Referring to FIG. 1, a winch 1 is shown comprising two locating blocks 2A、2B, two pairs of spacer rods 3 connected between the two locating blocks 2A、2B to keep the two locating blocks 2A、2B apart at a predetermined distance, a motor 4 mounted at an outer side of one locating block 2A opposite to the spacer rods 3, a deceleration clutch mechanism 5 mounted at an outer side of the other locating block 2B opposite to the spacer rods 3, and a winch drum 6 coupled between the two locating blocks 2A、2B to wind up a cable (not shown). Thus, the winch 1 the motor 4 as the power source to provide a rotary driving force that is transferred through the deceleration clutch mechanism 5 to rotate winch drum 6, thereby pulling in or letting out the cable.

Referring to FIGS. 2-5 and FIG. 1 again, a winch brake 10 in accordance with the present invention is shown installed in the aforesaid winch 1. As illustrated, the winch brake 10 comprises a brake bush 50, a driving block 20, a brake spring 30 and a driven block 40 accommodated in the brake bush 50 in a proper order, and a one-way bearing 60 surrounds the brake bush 50 for enabling the brake bush 50 to be rotatable relative to the one-way bearing 60 in a first direction D1 only.

The driving block 20 comprises a first through hole 21 located on one side thereof remote from the brake bush 50 and configured to receive one end of an output shaft 4A of the motor 4 for enabling the driving block 20 to be rotated by the motor 4.

The driving block 20 further comprises a mandrel 22 extending toward the brake bush 50, and two protruding flanges 23 disposed at two opposite sides relative to the mandrel 22. The mandrel 22 has a length greater than the protruding flanges 23.

The driven block 40 comprises a second through hole 41 located at the center thereof. One end of the second through hole 41 remote from the brake bush 50 has a hexagonal cross section for the insertion of one end of a transmission shaft 5A of the deceleration clutch mechanism 5. The driven block 40 further comprises two protruding flanges 42 spaced from each other at a predetermined angle and extending toward the driving block 20 for coupling to the mandrel 22 of the driving block 20.

The brake spring 30 is formed of two coils that are attached together with respective opposite ends curved into respective retaining end portions 31. The brake spring 30 is mounted around the protruding flanges 23 of the driving block 20 and the protruding flanges 42 of the driven block 40 with the respective retaining end portions 31 respectively engaged into the gaps between the protruding flanges 23 of the driving block 20 and the gaps between the protruding flanges 42 of the driven block 40. Thus, when the driving block 20 is rotated by the output shaft 4A of the motor 4 in a second direction D2 reversed to the first direction D1, the brake spring 30 is forced to contract and to move away from the inner perimeter of the brake bush 50, and thus the brake bush 50 is not rotated. On the contrary, when rotating the driving block 20 in the first direction D1, the brake spring 30 will be driven to expand, forcing the outer perimeter of the brake spring 30 into friction contact with the inner perimeter of the brake bush 50, and thus the brake bush 50 can be rotated.

The one-way bearing 60 is mounted on the locating block 2A and prohibited from rotation relative to the locating block 2A. Further, the one-way bearing 60 comprises an outer race 61, which comprises a plurality of recessed portions 65 equiangularly spaced around an inner perimeter thereof, an inner race 62, which is mounted inside the outer race 61 and comprises a plurality of radial ribs 63 equiangularly spaced around an outer perimeter thereof and a plurality of accommodation chambers 64 respectively defined between each two adjacent radial ribs 63 corresponding to the recessed portions 65 of the outer race 61, a needle roller 66 mounted in each accommodation chamber 64, and a spring 67 mounted in each accommodation chamber 64 and stopped between the associating needle roller 66 and a first wall 631 of one radial rib 63 of the associating accommodation chamber 64 to force the associating needle roller 66 against a second wall 632 of the associating accommodation chamber 64. Thus, when rotating the brake bush 50 in the first direction D1, the needle rollers 66 will be forced by the respective springs 67 into the respective recessed portions 65 of the outer race 61, allowing continuous rotation of the brake bush 50. When rotating the brake bush 50 in the second direction D2 reversed to the first direction D1, the needle rollers 66 will be stopped by the second walls 632 of the respective radial ribs 63 and prohibited from rotation, and at the same time, thereby stopping the brake bush 50 from rotation. Thus, one-way rotation of the brake bush 50 is controlled.

It is to be understood that the use of the aforesaid one-way bearing 60 is simply an example of the present invention. Any other conventional one-way bearing designs can be used with the brake bush 50.

Thus, when the motor 4 is rotated to pull in the cable (not shown) at the winch drum 6, the output shaft 4A of the motor 4 drives the driving block 20 to rotate in the first direction D1, at this time, the brake spring 30 is forced to expand and to contact the inner perimeter of the brake bush 50 tightly, and the rotary driving force is transferred through the retaining end portions 31 to the driven block 40, forcing the brake bush 50 and the driven block 40 to rotate in the first direction D1.

When the motor 4 is rotated to let out the cable at the winch drum 6, the output shaft 4A of the motor 4 drives the driving block 20 to rotate in the second direction D2, at this time, the brake spring 30 is forced to contract and to move away from the inner perimeter of the brake bush 50, and the rotary driving force is transferred through the retaining end portions 31 to the driven block 40 to rotate the driven block 40 in the second direction D2 without driving the brake bush 50, and therefore the brake bush 50 stands immovable at this time.

When electrically conducting the motor 4, the rotary driving force will be transferred through the driving block 20, the brake spring 30 and the driven block 40 to the transmission shaft 5A of the deceleration clutch mechanism 5, causing rotation of the winch drum 6. When the motor 4 is electrically disconnected and stopped, either due to switching off the power supply or accidental power failure, the force from the winch drum 6 will be transferred through the driven block 40 to the brake spring 30, causing the brake spring 30 to expand and to stop the outer perimeter thereof against the inner perimeter of the brake bush 50 that is prohibited from rotation by the one-way bearing 60. At this time, the brake spring 30 and the one-way bearing 60 provide an automatic braking function, enhancing operational safety.

Further, the deceleration clutch mechanism 5 is used with the winch brake 10 to reduce the speed of the motor 4 that is outputted to the winch drum 6, and to temporarily interrupt the transfer of the driving force of the motor 4 to the winch drum 6 for allowing free rotation of the winch drum 6 so that a user can pull out the cable directly and rapidly.

Figure 6:
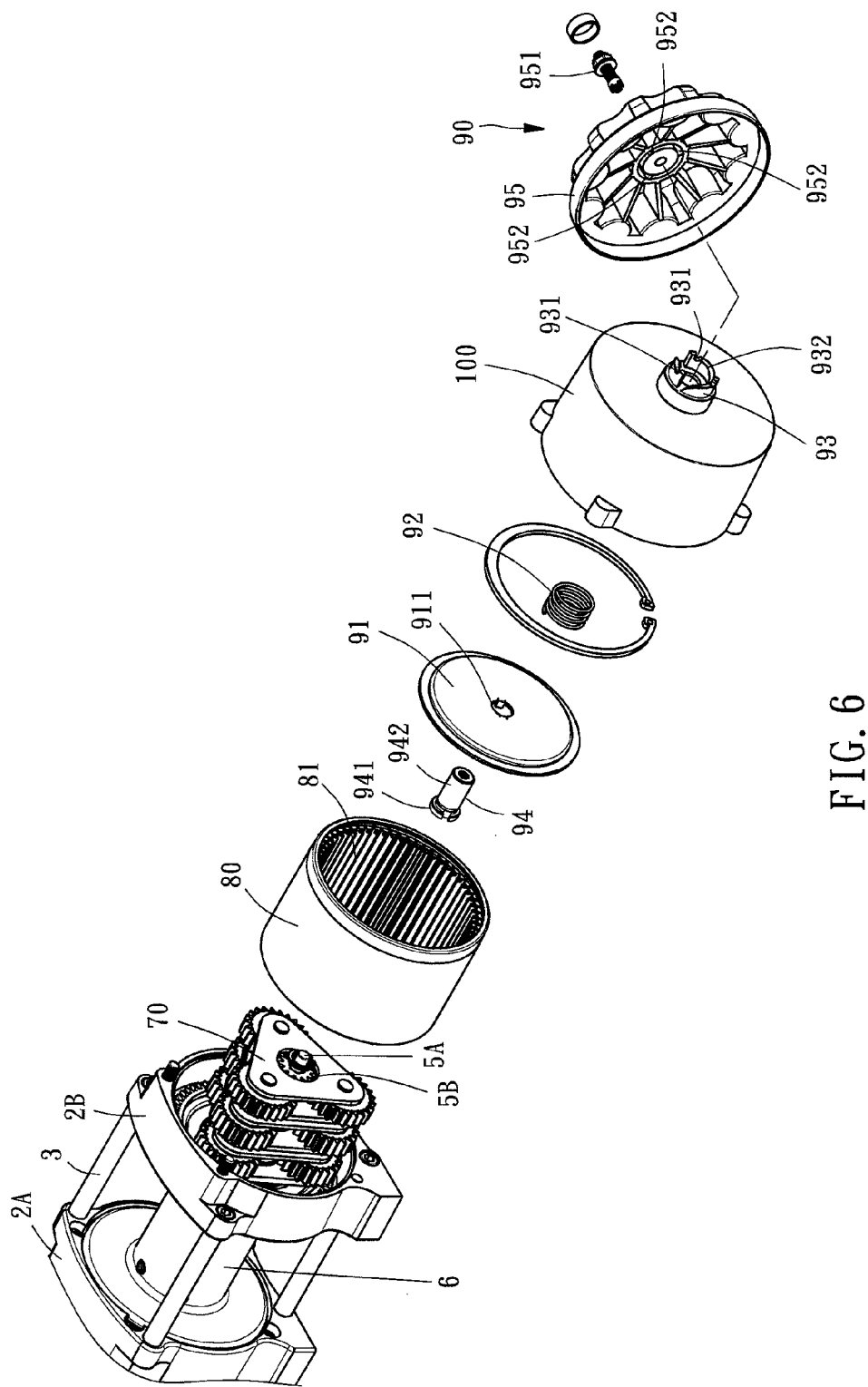
FIG. 6 is an exploded view of the deceleration clutch mechanism of the winch in accordance with the present invention.

Referring to FIG. 6, the deceleration clutch mechanism 5 is mounted in a housing 100, comprising the aforesaid transmission shaft 5A, a speed reducing gear set 70, a roller 80, and an adjustment unit 90.

The transmission shaft 5A is inserted through the winch drum 6, having a pinion 5B fixedly mounted at one end thereof corresponding to the driven block 40.

The speed reducing gear set 70 is formed of a plurality of gears arranged in a coaxial manner relative to the transmission shaft 5A and meshed with the pinion 5B.

The roller 80 is kept in a coaxial relationship relative to the transmission shaft 5A and rotatably and slidably mounted inside the housing 100, comprising a plurality of axial teeth 81 spaced around a tapered inner perimeter thereof. The roller 80 is axially movable between an engaged position where the axial teeth 81 are meshed with the speed reducing gear set 70, and a disengaged position where the axial teeth 81 are disengaged from the speed reducing gear set 70.

The adjustment unit 90 comprises a cover 91 fixedly covered on one side of the roller 80 and having a center hole 911, a spring member 92 set between the cover 91 and the housing 100, an annular positioning guide 93 arranged on the outside of the housing 100 and defining three equiangularly spaced positioning recesses 931 and three equiangularly spaced guide grooves 932, and a transmission rod 94 having a body portion 942 inserted through the center hole 911 of the cover 91 and the housing 100 and the positioning guide 93 and a head 941 located on one end of the body portion 942 and stopped at one side of the cover 91 opposite to the housing 100. The adjustment unit 90 further comprises a rotating wheel 95 and a screw bolt 951 fastened to one end of the transmission rod 94 outside the housing 100. The rotating wheel 95 comprises three protruding portions 952 selectively engaged into the three equiangularly spaced positioning recesses 931 or guide grooves 932 the annular positioning guide 93. Thus, the rotating wheel 95 can be rotated toward or away from the housing 100 within a predetermined angle.

Figure 7:
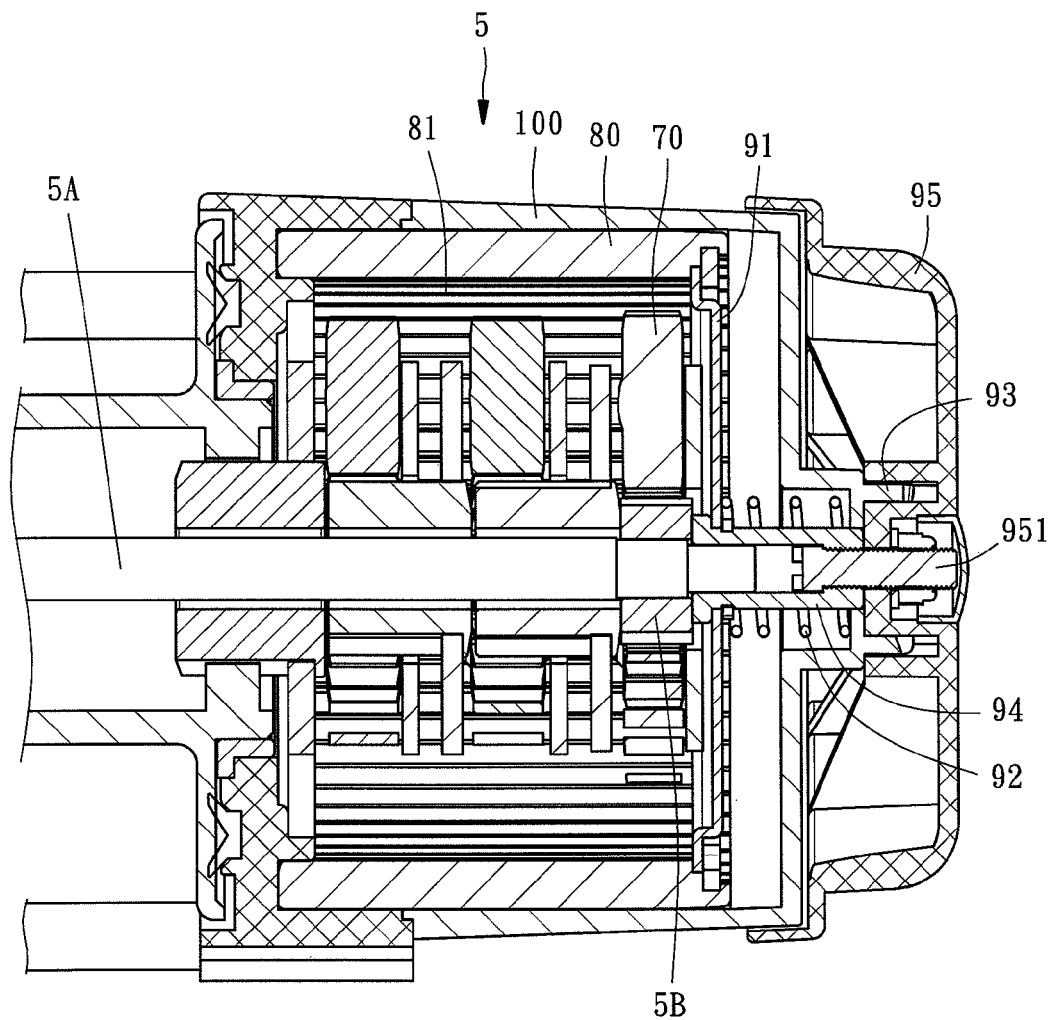
FIG. 7 is a sectional view of the present invention, illustrating the deceleration clutch mechanism of FIG. 6 installed in the winch and the roller in the disengaged position.
Figure 8:
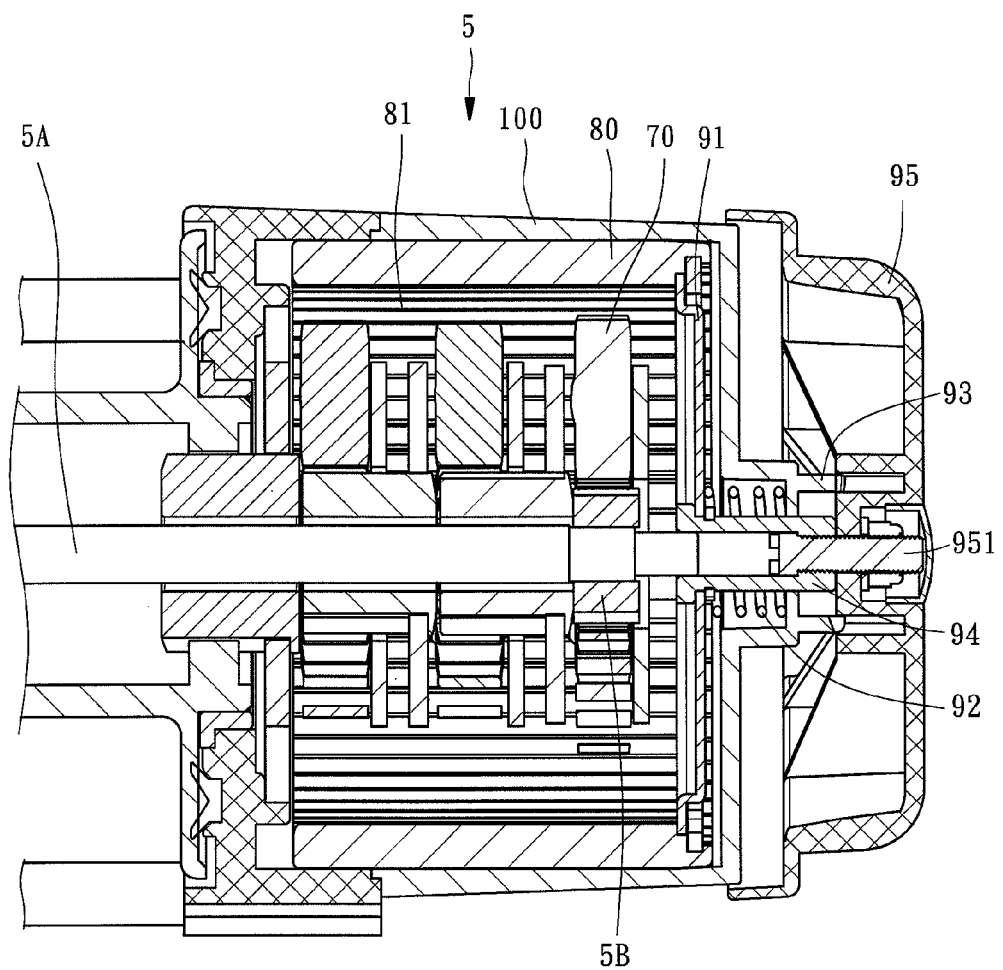
FIG. 8 is a sectional view of the present invention, illustrating the deceleration clutch mechanism of FIG. 6 installed in the winch and the roller in the engaged position.

Thus, when at the initial state, as shown in FIG. 7, the user can rotate the rotating wheel 95 by hand in direction away from the housing 100 subject to the effect of the guide grooves 932 to guide the protruding portions 952 of the rotating wheel 95. When continuously rotating the rotating wheel 95, the protruding portions 952 of the rotating wheel 95 will be guided into the respective positioning recesses 931, the transmission rod 94 and the cover 91 will be moved in direction away from the locating block 2B, and at the same time, the roller 80 will be moved to the disengaged position to disengage the axial teeth 81 from the speed reducing gear set 70, as shown in FIG. 8. At this time, the driving force from the motor 4 cannot be transferred through the deceleration clutch mechanism 5 to the winch drum 6, and the winch drum 6 can be rotated freely.

On the contrary, when the user rotates the rotating wheel 95 toward the housing 100, as shown in FIG. 7, the transmission rod 94 and the cover 91 will move the roller 80 to the engaged position, forcing the axial teeth 81 into mesh with the speed reducing gear set 70. At this time, the driving force from the motor 4 can be smoothly transferred through the deceleration clutch mechanism 50 to the winch drum 6, rotating the winch drum 6 to pull in or let out the cable.

Based on the aforesaid structural arrangement, the winch brake of the winch provided by the present invention ensures operational safety and has the characteristic of high durability. Further, the winch brake is matched with a simple, easy-to-operate deceleration clutch mechanism, facilitating operation.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A winch brake used with a deceleration clutch mechanism and installed with said deceleration clutch in a winch comprising at least, a motor and a winch drum, the winch brake comprising:
   a driving block having one end thereof connected to an output shaft of said motor of said winch and rotatable by said motor and an opposite end thereof provided with two spaced protruding flanges;
   a driven block having one end disposed remote from said driving block and connected to a transmission shaft of said deceleration clutch mechanism for synchronous rotation and an opposite end thereof provided with two spaced protruding flanges;
   a brake spring mounted between said driving block and said driven block, said brake spring having at least one retaining end portion disposed at each of two opposite ends thereof and respectively engaged into gaps between the two protruding flanges of said driving block and gaps between the two protruding flanges of said driven block for enabling said brake spring to be driven by one of said driving block and said driven block to contract or to expand;
   a brake bush accommodating said driving block, said driven block and said brake spring, said brake bush having an inner perimeter for friction contact with an outer perimeter of said brake spring when said brake spring is driven to expand; and
   a one-way bearing fixedly mounted in said winch around said brake bush to limit rotation of said brake bush in a first direction.

2. The winch brake as claimed in claim 1, wherein said driving block comprises a mandrel extending toward said brake bush, said mandrel having a length greater than the length of the protruding flanges of said driving block so that the protruding flanges of said driven block are capable onto said mandrel.

3. The winch brake as claimed in claim 2, wherein said driving block comprises a first through hole; said driven block comprises a second through hole; said mandrel is a hollow member fastened to said first through hole and said second through hole by a screw bolt to connect said driving block and said driven block together.

4. The winch brake as claimed in claim 1, wherein said brake spring is formed of two coils, said coils being attached together, each having two opposite ends respectively terminating in one said retaining end portion.

5. The winch brake as claimed in claim 4, wherein when said driving block is rotated by said output shaft of said motor in a second direction reversed to said first direction, said brake spring is forced to contract and to move away from the inner perimeter of said brake bush; on the contrary, when said driving block is rotated in said first direction, said brake spring is driven to expand, forcing the outer perimeter of said brake spring into friction contact with the inner perimeter of said brake bush to let said brake bush be rotated by said driving block.

6. The winch brake as claimed in claim 1, wherein said one-way bearing comprises an outer race comprising a plurality of recessed portions equiangularly spaced around an inner perimeter thereof, an inner race mounted inside said outer race said inner race comprising a plurality of radial ribs equiangularly spaced around an outer perimeter thereof and a plurality of accommodation chambers respectively defined between each two adjacent said radial ribs corresponding to the recessed portions of said outer race, a needle roller mounted in each said accommodation chamber, and a spring mounted in each said accommodation chamber and stopped between the associating said needle roller and a first wall of one said radial rib of associating said accommodation chamber to force the associating said needle roller against a second wall of the associating said accommodation chamber.

7. The winch brake as claimed in claim 1, wherein said deceleration clutch mechanism is mounted in a housing of said winch, comprising:
   said transmission shaft inserted through said winch drum;
   a pinion mounted at said transmission shaft corresponding to said driven block;
   a speed reducing gear set formed of a plurality of gears and arranged in a coaxial manner relative to said transmission shaft for meshing with said pinion;
   a roller arranged in a coaxial relationship relative to said transmission shaft and rotatably and slidably mounted in said housing, said roller comprising a plurality of axial teeth spaced around a tapered inner perimeter thereof, said roller being axially movable between an engaged position where said axial teeth are meshed with said speed reducing gear set and a disengaged position where said axial teeth are disengaged from said speed reducing gear set; and an adjustment unit for controlling said roller to slide along said transmission shaft.

8. The winch brake as claimed in claim 7, wherein said adjustment unit comprises a cover disposed at one side of said roller, a spring member set between said cover and said housing, a rotating wheel pivotally mounted outside said housing and movable axially in two reversed directions toward or away from said housing, and a transmission rod connecting said cover and said rotating wheel for enabling said rotating wheel to control sliding movement of said roller.

9. The winch brake as claimed in claim 8, wherein said adjustment unit further comprises a positioning guide mounted outside said housing, said positioning guide comprising three equiangularly spaced positioning recesses and three equiangularly spaced guide grooves; said rotating wheel comprises three equiangularly spaced protruding portions movable between said three equiangularly spaced positioning recesses and three equiangularly spaced guide grooves for enabling said rotating wheel to be rotated within a predetermined angle toward or away from said housing.

10. The winch brake as claimed in claim 9, wherein said transmission rod comprises a body portion inserted through said cover, said housing and said positioning guide and affixed to said rotating wheel by a screw bolt, and a head located on one end of said body portion and stopped at one side of said cover opposite to said housing.

* * * * *